United States Patent [19]

Leavitt

[11] Patent Number: 4,850,364

[45] Date of Patent: Jul. 25, 1989

[54] MEDICAL ULTRASOUND IMAGING SYSTEM WITH VELOCITY-DEPENDENT REJECTION FILTERING

[75] Inventor: Steven C. Leavitt, Hampstead, N.H.

[73] Assignee: Hewlett-Packard Company, Palo Alto, Calif.

[21] Appl. No.: 119,754

[22] Filed: Nov. 12, 1987

[51] Int. Cl.[4] .............................................. A61B 5/08
[52] U.S. Cl. ............................................... 128/661.09
[58] Field of Search .............. 128/663, 661.08–661.10; 73/851.25

[56] References Cited

U.S. PATENT DOCUMENTS

| | | | |
|---|---|---|---|
| 4,593,700 | 6/1986 | Hayakawa et al. | 128/663 |
| 4,612,937 | 9/1986 | Miller | 128/663 |
| 4,641,668 | 2/1987 | Namekawa | 128/663 |
| 4,660,565 | 4/1987 | Shirasaka | 128/663 |

Primary Examiner—Francis Jaworski
Attorney, Agent, or Firm—Frank R. Perillo

[57] ABSTRACT

A medical Doppler ultrasound imaging system with improved filtering to separate blood flow information from clutter due to heart wall and vessel motion. In combination with a clutter rejection filter and velocity determination system as in the prior art, a velocity sample rejection system implements a velocity-dependent (i.e., frequency-dependent) threshold for rejecting velocity values, or samples, based on too weak echoes. That is, the acceptance/rejection threshold is a function of frequency. Optimally, the shape of the velocity-dependent thresholding function closely matches that of the attenuation transfer function of the clutter rejection filter. Thuys, for low velocity samples (corresponding to low Doppler frequency shifts), the rejection threshold is substantially lower than it is for high velocity samples. The rejection level increases monotonically as the signal deviates from the I.F.

5 Claims, 3 Drawing Sheets

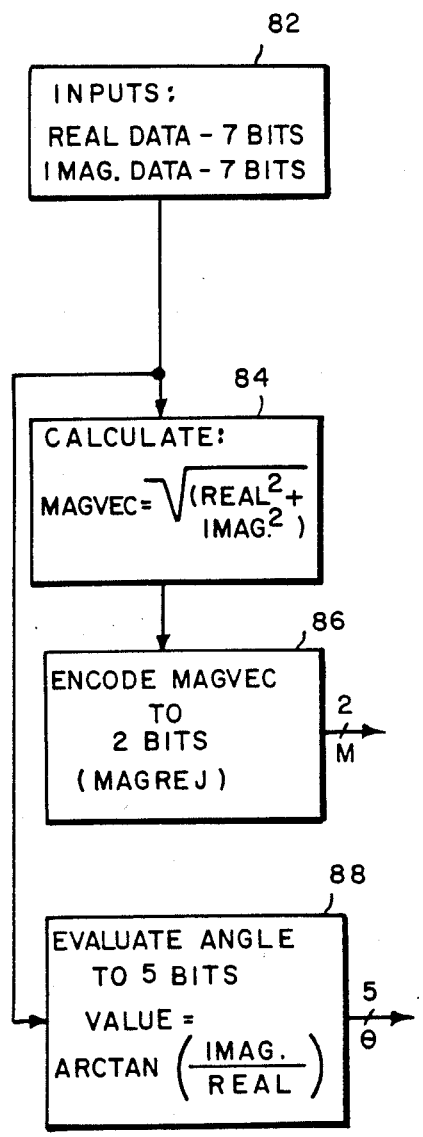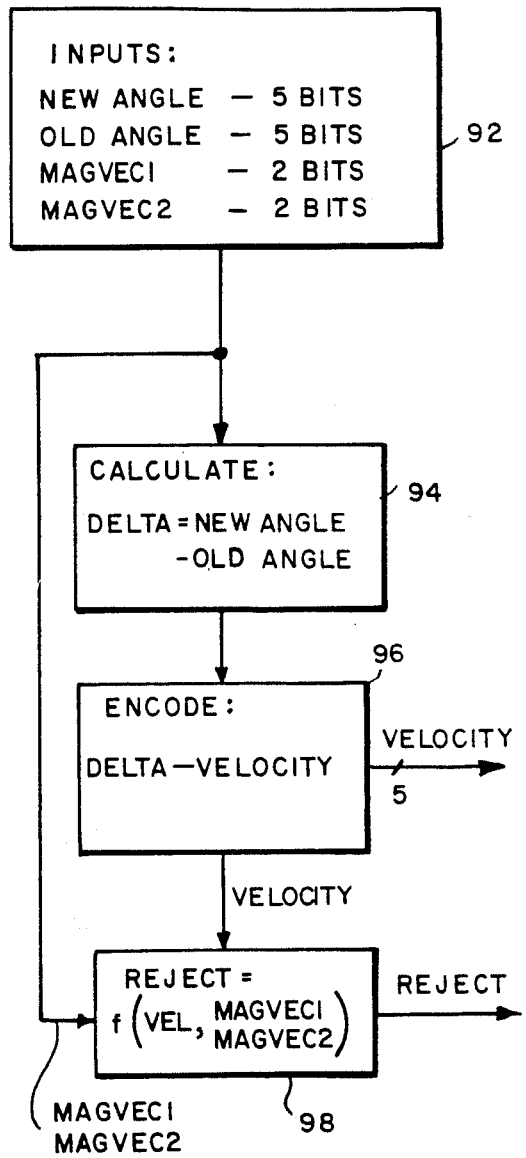
FIG.5                     FIG.6

MEDICAL ULTRASOUND IMAGING SYSTEM WITH VELOCITY-DEPENDENT REJECTION FILTERING

FIELD OF THE INVENTION

This invention relates to the field of ultrasound imaging and, in particular, to ultrasound imaging for medical diagnostic purposes. More specifically, the invention relates to improved signal filtering for use in cardiovascular ultrasound flow mapping, permitting improved discrimination between blood flow and heart wall motion.

BACKGROUND OF THE INVENTION

The use of ultrasonic imaging for medical diagnostic purposes is well-known. In particular, ultrasound has been used for over twenty years to aid in the diagnosis of certain cardiac diseases. Recently, cardiac Doppler ultrasound technology has become recognized as an important tool in the evaluation of cardiac blood flow rates. In Doppler ultrasound imaging, a reflection from a stationary object provides a signal at zero frequency (that is, at the intermediate frequency). The Doppler frequency shift in the echo signal returned from a moving target, though, varies monotonically with the instantaneous velocity of the target. A good, but brief, review of cardiac Doppler measurement technology is contained in R.G. O'Connell, Jr., "The Role of Doppler Ultrasound in Cardiac Diagnosis," *Hewlett-Packard Journal,* June 1986 at 20-25; in P.A. Magnon, "Doppler Effect: History and Theory," id. at 26-31; in L.I. Halberg et al, "Extraction of Blood Flow Information Using Doppler-Shifted Ultrasound," id. at 35-40; and in B.F. Hunt et al, "Digital Processing Chain for a Doppler Ultrasound Subsystem," id. at 45-48. As stated in the O'Connell article, there are two important aspects to the Doppler equation which impose limitations where the evaluation of cardiac disease is concerned. The first apsect is the angle between the flow velocity of interest and the incident ultrasound beam. The most accurate velocities are measured when the angle is very small. However, when searching for certain cardiac anomalies, such as high-velocity jets caused by stenotic, regurgitant, or shunt lesions, or defects in the heart, the exact angle of flow is unknown, and movement or rotation of the transducer is necessary until the location of the highest maximum velocity is obtained. The other important aspect of the equation is the proportional relationship between the frequency used to interrogate the blood flow and the resultant frequency shift. Due to this relationship, both pulsed Doppler and continuous-wave (CW) Doppler measurements are often employed.

A typical prior art medical ultrasound imaging system employs a phased array transducer, a scanner unit and a signal processing and display unit. The scanner unit provides analog signal conditioning, beam forming and signal translation from the ultrasound range to a more convenient intermediate frequency (I.F.) range. (The details of a typical beam forming operation and scanning function are discussed in S.M. Karp, "Modifying an Ultrasound Imaging Scanner for Doppler Measurements," *Hewlett-Packard Journal,* June 1986 at 41-44). The processing and display unit then converts the analog I.F. signals to digital form and processes the digital samples in order to facilitate extraction and display of desired information contained in the transducer output. The display and processing unit may provide both black and white (monochrome) as well as color imaging. The monochrome mode typically is used to show anatomic detail, with blood flow shown in the color mode. In a typical system, a two-dimensionsal monochrome image may show a sector- (i.e., arcuately-) shaped scan region (i.e., volume) of a patient, displayed at a rate of approximately 30 frames per second. A color mode image may be overlaid on a portion (up to 100%) of the scanned sector, displacing the monochrome image. At each picture element on the display, either the monochrome signal or the color signal is displayed; alternatively, the two signals may be combined in some fashion.

The color image is typically a color-coded blood flow map, where the color coding indicates localized velocity and tubulence of blood flow. In an exemplary commercial system, velocity is shown in shades of red and blue, red indicating flow toward the transducer and blue indicating flow away from the transducer, or vice versa; sometimes another color may be mixed in over a portion of the scale, to focus attention on flows within selected ranges. The intensity and/or shading of the color represents the speed of the flow toward or away from the transducer. Shades of green are sometimes added to indicate turbulence.

Velocity is measured using Doppler frequency shift techniques, which are well known. Turbulence is calculated, based on sample-to-sample consistency of velocities. Unfortunately, the received (i.e., echoed) signal at the transducer output contains not only a Doppler shift component due to reflection from the moving blood, but also Doppler components due to reflections from the motion of tissue structures such as blood vessels, heart walls and valves. Most significantly, since the heart wall is constantly in motion and is denser than the blood, it contributes a substantial Doppler signal which is significantly larger in amplitude (but generally lower in frequency) than the signal generated by the blood flow itself. A primary function of the signal processing and display unit is, therefore, to separate to the extent possible the signal due to the blood flow from other extraneous signals, such as those due to heart wall motion (These extraneous signals may be termed "clutter.")

Separation of the blood flow signal from the clutter is achieved with a clutter rejection filter and a velocity sample rejection system. The clutter rejection filter provides a frequency-dependent attenuation (or gain) of the received (i.e., returned echo) Doppler signal; the gain is higher for the blood flow signals (which are higher in frequency since blood flow is higher in velocity) than for the clutter signals. After the received signal has been thus filtered, it is sampled and velocity calculations are made from samples. Each computed velocity value is then "screened" against certain rejection (i.e., validation) criteria by the velocity sample rejection system. Velocities which have been determined from samples whose amplitudes (or at least one of whose amplitudes) are (is) below a predetermined acceptance/rejection threshold are considered unreliable and are therefore "discarded" by the velocity sample rejection system (i.e., they are neither displayed nor used in further calculations).

OBJECTS AND SUMMARY OF THE INVENTION

The present invention provides an improved system for extracting blood flow information from "clutter" in a medical ultrasound system, to provide a better signal-to-noise ratio.

In the past, the signal processing used in the velocity sample rejection system, for separating the blood flow echo from the other Doppler components in the reflected signal, has used a simple, frequency-independent thresholding function. That is, any received signal sample having an amplitude below a selected threshold was discarded; the threshold was the same for all frequencies.

The present invention may utilize the same clutter rejection filter and velocity determination system as in the prior art (or any equivalent clutter rejection filter and velocity determination means). However, in contrast with the prior art, the present invention utilizes, in combination with these elements, a velocity sample rejection system which implements a velocity-dependent (i.e., frequency-dependent) rejection threshold. That is, the acceptance/rejection threshold is a function of frequency. Optimally, the shape of the velocity-dependent thresholding function closely matches that of the attenuation transfer function of the clutter rejection filter. Thus, for low velocity samples (corresponding to low Doppler frequency shifts), the rejection threshold is substantially lower than it is for high velocity samples. The rejection level increases monotonically as the signal deviates from the I.F. This type of frequency-dependent clutter and reject filtering has been found to improve the signal-to-noise ratio (i.e., clutter rejection) by about 12 dB, for the particular clutter rejection filter used in the HP,77020 system identified above.

These and other objects and advantages of the present invention will become more readily apparent from the detailed description provided below, which should be read in conjunction with the accompanying drawing. The invention is limited only as set forth in the claims appended to the end hereof.

BRIEF DESCRIPTION OF THE DRAWING

FIG. 5 is a high-level flow chart for the operation of ROM 54 of FIG. 2A; and

FIG. 6 is a high-level flow chart for the operation of the VRFG ROM 60 of FIG. 2A.

DETAILED DESCRIPTION

Figure 1:
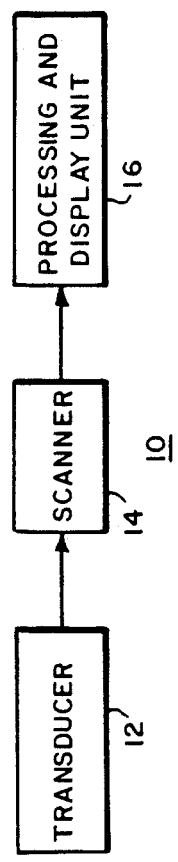
FIG. 1 is a high-level block diagram of a Doppler ultrasound system of the type in which the present invention may be used.

Turning now to FIG. 1, there is shown a block diagram of a Doppler ultrasound system 10 of the type in which the present invention may be used. One such prior art system which is commercially available is the model HP 77020 Phased Array Ultrasound System sold by Hewlett-Packard Company Medical Products Group, Andover, Mass. The system employs a phased array ultrasound transducer 12, a scanner unit 14 and a processing and display unit 16. The scanner unit 14 generates the signals to control the transducer array 12 so as to generate a directed beam of ultrasonic energy, and receives (and optionally filters and amplifies) the echoes detected by the transducer array. The output of the transducer array is an analog Doppler shift signal centered about a predetermined frequency, the I.F.

Figure 2A:
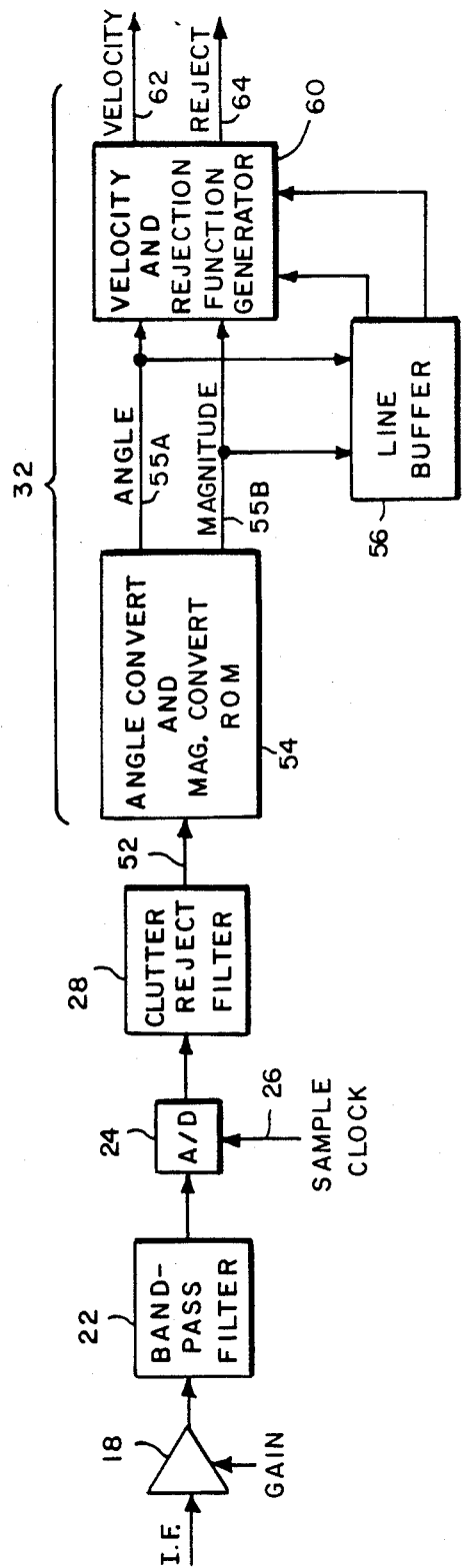
FIGS. 2A and 2B together form a block diagram of a processing and display unit for use in the system of FIG. 1, in accordance with the present invention.
Figure 2B:
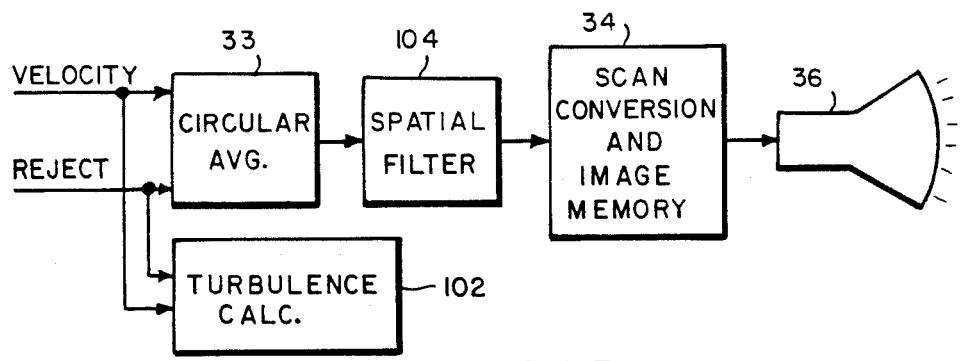

The output from the scanner unit 14 is supplied to processing and display unit (PDU) 16, a block diagram of which is shown in FIGS. 2A and 2B. The first stage of the PDU is a variable gain amplifier 18; the gain of this amplifier is manually set by the operator. The output of the amplifier 18 is run though a bandpass I.F. filter 22. The I.F. filter 22 passes the complete range of intermediate frequencies, which typically may be from one to three megahertz. Although the filter 22 is used to optimize the signal-to-noise ratio of the returning echo, the Doppler signal has yet to be extracted. A sampling process is used to detect the Doppler shift and, hence, to determine the blood velocity at a given depth in the body of the patient. (Generally, the output of the bandpass filter 22 is fed through a notch filter, not shown, in order to attenuate any signal component from the local oscillator for the transducer; such component(s) could interfere with the signal processing).

In pulse Doppler mode, the signal transmitted into the patient's body by the transducer contains energy only at the harmonics of the pulse repetition frequency (PRF). The returning echo, on the other hand, contains components originating from two types of sources: stationary tissue and nonstationary tissue (including blood). The echoes from stationary tissue, like the emitted signal, contain energy only at the PRF harmonics. By contrast, the echoes from moving targets contain energy at frequencies shifted from the PRF harmonics by an amount proportional to the velocity of the target, as described by the Doppler equation. The system is designed to detect these frequency shifts.

The sum of the two echo types (in the filtered I.F. output) is sampled by an analog-to-digital converter (ADC) 24, which then supplies complex samples. The timing of the sampling operation is controlled by a sampling clock supplied on line 26. A sample is taken at each and every pulse repetition interval (PRI, where PRI=1/PRF) at a specific time corresponding to the depth of the desired sample volume. Essentially, the process of sampling can be restated as the translation and summing of each of the harmonics of the PRF and their immediate spectrums down to baseband. The spectrum is mirrored about the frequency PRF/2 (referred to as the Nyquist rate). One practical implication is that forward and reverse flow cannot be distinguished when only a single sampler is used.

To permit resolution of flow direction, quadrature sampling is often used. In a quadrature system, a pair of samplers is provided. A short time after a first one of the samplers take a sample, the second sampler takes another sample of the same signal. The delay between the two samplings is one-fourth the period of the I.F. The lead-lag phase relationship between the two sets of samples provides flow direction information. Additionally, the inclusion of the second sampler effectively doubles the Doppler bandwidth, allowing shifts from —Nyquist to +Nyquist frequencies to be distinguished. Alternatively, a conventional quadrature baseband mixing system may be used, sampling its output to produce the complex samples.

A conventional clutter rejection filter 28 is used to reject unwanted Doppler signals. These unwanted signals are chiefly "wall signals"—that is, reflections from the stationary or slowly moving heart and vessel walls as well as from the tissue between the transducer and the flow volume being interrogated. Such wall signals are typically 100 times as large as the echo received from the blood and are distinguished by having a much lower frequency Doppler shift than the echoes from the blood motion. The clutter rejection filter exploits this frequency separation to attenuate the low-frequency wall signals so that they will not obscure the desired blood flow data. FIG. 2 shows in curve 40 a typical response for a clutter rejection filter.

A Doppler processing system 32 then decodes the filtered signal to convert the "de-cluttered" Doppler frequency information into velocity information at each spatial point in the sampled volume. These raw velocity calculations are not immediately displayed. Rather, velocity samples are first separated into "good" samples and "bad" samples by a velocity sample rejection system. The "bad" samples are discarded, and a circular averager 33 uses only the "good" samples to generate the average velocity at each point. The averaging of velocity measures in stage 33 is a so-called "circular" averaging process which takes into account the fact that velocity is represented as a complex variable using modulo arithmetic. The averaged velocity data is supplied to an image memory and scan conversion subsystem 34 which generates the signals to control a display monitor 36 in order to show an image representing the measured blood flow in the sampled volume.

Figure 3:
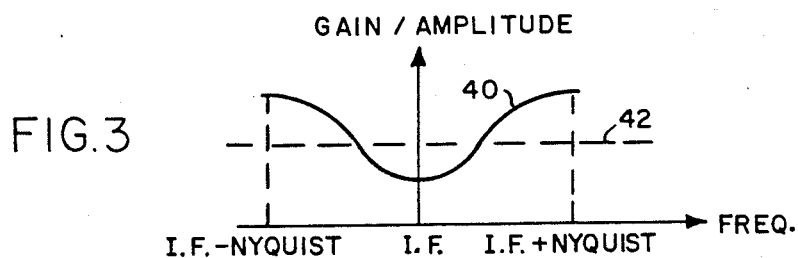
FIG. 3 is a diagrammatic illustration of the gain response of the clutter rejection filter 28 of FIG. 2A, showing a flat, frequency-independent velocity acceptance/rejection threshold superimposed thereon.
Figure 4:
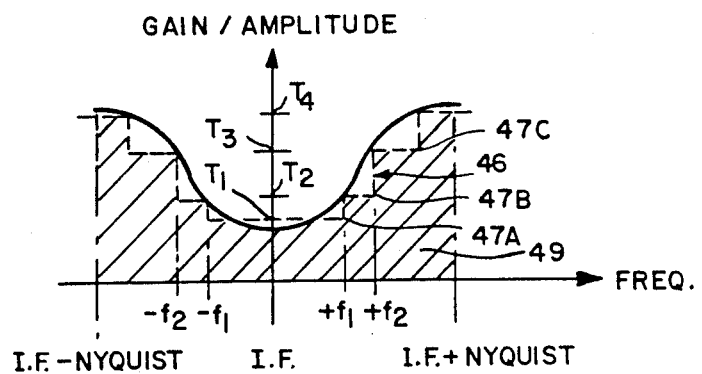
FIG. 4 is another diagrammatic illustration of the same gain response of the clutter rejection filter 28, showing an exemplary frequency-dependent velocity acceptance/rejection threshold function superimposed thereon.

The present invention is distinguished from the prior art in the particulars of the clutter rejection filtering and associated velocity sample rejection system, which uses a velocity-dependent threshold to distinguish between "goodness" and "badness" of velocity samples. The response of the prior art velocity sample rejection system is represented by the flat threshold function shown at line 42 in FIG. 3, superimposed on the clutter filter response curve 40. Note that the ordinate shows gain for the clutter rejection filter but amplitude for the rejection threshold function. The present invention, by contrast, employs a rejection threshold response as shown in FIG. 4 at curve 46. This rejection threshold function 46 is a frequency-dependent stepwise approximation to the clutter filter response 44. Use of the function of curve 46 results in (1) rejection of high-amplitude, high-velocity signals (already subjected to the clutter filter gain function) which would have been accepted by the threshold function of curve 42 and (2) acceptance of low velocity, low amplitude blood flow signals which would have been rejected by a fixed threshold set at a higher level than is required when multiple levels can be used. In FIG. 4, rejection threshold function 46 is shown as having four levels. That choice is for exemplification only, as the system designer may choose a different number of level without departing from the spirit of the invention. The locations of the threshold-level-transition points (e.g., points 47A, 47B, 47C) may be decided empirically.

The velocity-dependent-rejection response of the present invention is accomplished by an apparatus which screens out (from further processing) velocity samples which do not meet the acceptability criteria—i.e., are based on echoes whose amplitudes fall below the threshold function. (Note that the term "velocity sample" is somewhat of a misnomer; velocities are calculated, not sampled. Nevertheless, in the vernacular, each calculated velocity value is often called a sample.) Since the calculation of velocity is based on a differential phase measurement, each velocity value actually requires two signal samples. The acceptance or rejection of a velocity sample thus depends on the acceptability of the pair of signal samples used to calculate that velocity value. Each sample is a complex value—i.e., it has both magnitude and phase. Consequently, the rejection criteria depends on four variables: two magnitudes and two phases. Stated another way, the rejection function depends on the amplitudes of the two echo samples and on the calculated velocity (since the phase difference divided by the sampling period gives the velocity).

The system providing this operation is shown in FIGS. 2A and 2B. The complex output of the clutter rejection filter 28, on line 52, is decoded by an angle and magnitude conversion ROM (i.e., read-only memory) 54. ROM 54 provides the phase (on line 55A) and magnitude (on line 55B) of each sample. This phase and magnitude information is stored in a temporary memory called a line buffer, 56. The system divides each scanned sector into a large number of consecutively adjacent scan lines. Each scan line is subdivided into a number of sample "points" (i.e., small volumes) at which localized Doppler measurements are taken. Line buffer 56 stores the samples for each line from one scan line to the next. (Typically, a line may be sampled several times in succession before the scanning beam is moved onto the next line.) A second ROM (called the "velocity and rejection function generator" ROM, or VRFG ROM) 60 receives each current sample's phase and magnitude information on lines 55A and 55B from ROM 54 while receiving the line buffer 56 the comparable information for the previous sample at the same spatial location. The VRFG ROM has two jobs: it decodes the phase information to provide on line 62 a signal (VELOCITY) providing a velocity sample and it generates the velocity rejection function (the REJECT or rejection signal, for short) on line 64. The VELOCITY signal is calculated by dividing the inter-sample angular progression by the PRI. The REJECT signal is a binary signal provided in a first state to indicate that the rejection threshold was exceeded for the current sample (i.e., the sample is "good"), and in a second state to indicate that the reject threshold was not exceeded (i.e., the sample is "bad"). (In the latter situation, the REJECT signal, is said to be "asserted" or "present".) The circular averaging stage 66 receives both outputs from VRFG ROM 60; however, it only processes those samples of the VELOCITY signal for which the REJECT signal is not asserted. That is, when the REJECT signal is asserted, the velocity value on line 62 is ignored or discarded; it is not averaged with prior velocity samples and it is not displayed.

FIG. 5 depicts a high-level flow chart for the operation of the angle and magnitude conversion ROM 54. In step 82, the real and imaginary data portions of a Doppler sample are received, each coded as seven bits. The vector magnitude (MAGVEC) of the sample is then computed in step 84 as the square root of the sum of the squares of the real and imaginary data. The magnitude is then encoded (in step 86) to a two-bit variable, MA- GREJ. In parallel, the angle of the sample vector is evaluated (in step 88) to a five-bit variable, VALUE. Of course, the number of bits used for each variable is to some degree a matter of design choice.

Similarly, FIG. 6 provides a high-level flow chart for the operation of the VRFG ROM 60. The inputs to this ROM (step 92) are a pair of five-bit angle values termed NEWANGLE (for the new, or current, sample) and OLDANGLE (for the preceding scan's sample, from the line buffer), and a pair of corresponding two-bit magnitude values labelled, respectively, MAGVEC1 (for the current sample) and MAGVEC2 (for the preceding sample). To calculate velocity, the value of OLDANGLE is first subtracted from that of NEWANGLE (in step 94), yielding a variable called DELTA. Next, DELTA is encoded into a corresponding five-bit velocity value, VELOCITY (step 96). Such an encoding is possible because the velocity is mathematically related to the angular change, DELTA; that is, VELOCITY =DELTA/PRI. The rejection signal, REJECT, is generated in step 98, as a function of the value of VELOCITY and the two magnitudes MAGVEC1 and MAGVEC2.

That functions serves the purpose of asserting the REJECT signal if for a given value of VELOCITY, either MAGVEC1 or MAGVEC2 is below the threshold level established for that velocity range.

Referring back to FIG. 4, the rejection function is defined by the shaded area 49 under the dashed threshold line 46. For purposes of the rejection function, the ordinate in FIG. 4 represents the amplitude of the echoes, which become encoded as MAGVEC1 and MAGVEC2 values. For example, in the frequency range from I.F. to $f_1$, (considering only the right half of the spectrum, since the two sides are symmetrical about the I.F.), the REJECT signal is asserted if either MAGVEC1 or MAGVEC2 is less than $T_1$. In the frequency range from $f_1$ to $f_2$, the threshold increases to $T_2$, and so forth. Alternatively, the system can look first at the lesser of MAGVEC1 and MAGVEC2 and then check to ensure that the corresponding frequencies are in the range where those amplitudes are acceptable.

The VELOCITY and REJECT signals on lines 62 and 64 are also applied to a turbulence calculator 102, which calculates a measure of the dispersion in values between successive samples at the same spatial location. The turbulence calculator is controlled by the REJECT signal, to ignore velocity samples not passing the rejection criteria. The turbulence calculation is supplied along with the circular averages to an optional spatial filter 104. The spatial filter can be a median filter, averaging filter, or other type of filter for enhancing the image.

Finally, the processed image is shown on display device 36.

Having thus described the concept and an exemplary implementation of the invention, various alterations, modifications and improvements will occur to those skilled in the art. These alterations, modifications and improvements are intended to be suggested herein and are within the spirit and scope of the invention. Accordingly, the foregoing description of an exemplary embodiment is not intended to be limiting. The invention is defined and limited only by the following claims and equivalents thereto.

What is claimed is:

1. In a medical Doppler ultrasound system of the type employing a transducer, a scanner unit and means operatively connected thereto for processing Doppler echoes received by the transducer to extract from the echoes, for display, signals corresponding to blood flow within a patient's body, the means for processing echoes including means for sampling echoes, means for rejecting clutter from such echoes, and means for calculating from time-displaced pairs of such samples corresponding blood flow velocity values at selected points within the patient, means for generating a velocity value reject signal for each velocity value not meeting predetermined acceptability criteria, and means responsive to said reject signal for calculating the average at each point of those velocity values for which a reject signal has not been generated, the improvement comprising:
   the means for generating a velocity value reject signal being adapted to compare against predetermined velocity-dependent criteria the amplitude of the velocity value and the amplitudes of the associated pair of samples, and generating a reject signal associated with the velocity value whenever one of said amplitudes fails said velocity-dependent criteria.

2. The system of claim 1 wherein the predetermined velocity-dependent criteria establishes for low velocity samples (corresponding to low Doppler frequency shifts) a rejection threshold substantially lower than the rejection threshold for high velocity samples.

3. The system of claim 2 wherein the rejection threshold increases monotonically as the echo frequency deviates from the I.F.

4. The system of claim 1 wherein the velocity-dependent criteria is, for at least one of said amplitudes, a stepwise approximation to the frequency response of the means for rejecting clutter.

5. A medical Doppler ultrasound system comprising:
   a. a transducer;
   b. a scanner unit operatively connected to the transducer for controlling the operation thereof and receiving Doppler echo signals therefrom;
   c. means operatively connected to the scanner unit for receiving therefrom and processing Doppler echoes to extract from the echoes, for display, signals corresponding to blood flow within a patient's body;
   d. the means for processing echoes including
      1. means for sampling echoes;
      2. means for rejecting clutter from such echoes,
      3. means for calculating from time-displaced parts of such samples corresponding blood flow velocity values at selected points within the patient, and
      4. means for generating a velocity value reject signal for each velocity value not meeting predetermined acceptability criteria;
   f. means responsive to said reject signal for calculating the average at each point of those velocity values for which a reject signal has not been generated; and
   g. the means for generating a velocity value reject signal comparing against predetermined velocity-dependent criteria the amplitude of the velocity value and the amplitudes of the associated pair of samples, and generating a reject signal associated with the velocity value whenever one of said amplitudes fails said velocity-dependent criteria.

* * * * *